United States Patent
Bhattacharyya et al.

(10) Patent No.: US 9,959,418 B2
(45) Date of Patent: May 1, 2018

(54) SUPPORTING CONFIGURABLE SECURITY LEVELS FOR MEMORY ADDRESS RANGES

(71) Applicant: Intel Corporation, Santa Clara, CA (US)

(72) Inventors: Binata Bhattacharyya, Portland, OR (US); Raghunandan Makaram, Northborough, MA (US); Amy L. Santoni, Scottsdale, AZ (US); George Z. Chrysos, Portland, OR (US); Simon P. Johnson, Beaverton, OR (US); Brian S. Morris, Santa Clara, CA (US); Francis X. McKeen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 90 days.

(21) Appl. No.: 14/803,956

(22) Filed: Jul. 20, 2015

(65) Prior Publication Data

US 2017/0024573 A1    Jan. 26, 2017

(51) Int. Cl.
*G06F 21/64* (2013.01)
*G06F 21/62* (2013.01)
*G06F 21/60* (2013.01)
*G06F 21/78* (2013.01)

(52) U.S. Cl.
CPC ............ *G06F 21/62* (2013.01); *G06F 21/602* (2013.01); *G06F 21/64* (2013.01); *G06F 21/78* (2013.01); *G06F 2221/2113* (2013.01)

(58) Field of Classification Search
CPC ..... G06F 21/602; G06F 21/62; G06F 12/1441
See application file for complete search history.

(56) References Cited

U.S. PATENT DOCUMENTS

| | | | |
|---|---|---|---|
| 2006/0047972 A1 | 3/2006 | Morais | |
| 2010/0296651 A1* | 11/2010 | Tkacik | G09C 1/00 380/44 |
| 2013/0036312 A1 | 2/2013 | Anquet et al. | |
| 2014/0223197 A1 | 8/2014 | Gueron et al. | |
| 2015/0089173 A1* | 3/2015 | Chhabra | G06F 12/1408 711/163 |
| 2015/0154423 A1 | 6/2015 | Millind | |

OTHER PUBLICATIONS

International Search Report dated Oct. 26, 2016 for PCT Patent Application No. PCT/US2016/037011, 15 pages.

* cited by examiner

*Primary Examiner* — Abiy Getachew
(74) *Attorney, Agent, or Firm* — Lowenstein Sandler LLP

(57) ABSTRACT

A processor implementing techniques for supporting configurable security levels for memory address ranges is disclosed. In one embodiment, the processor includes a processing core a memory controller, operatively coupled to the processing core, to access data in an off-chip memory and a memory encryption engine (MEE) operatively coupled to the memory controller. The MEE is to responsive to detecting a memory access operation with respect to a memory location identified by a memory address within a memory address range associated with the off-chip memory, identify a security level indicator associated with the memory location based on a value stored on a security range register. The MEE is further to access at least a portion of a data item associated with the memory address range of the off-chip memory in view of the security level indicator.

18 Claims, 12 Drawing Sheets

SUPPORTING CONFIGURABLE SECURITY LEVELS FOR MEMORY ADDRESS RANGES

TECHNICAL FIELD

Embodiments of the disclosure relate generally to computer systems, and more specifically, but without limitation, to supporting configurable security levels for memory address ranges.

BACKGROUND

Securing execution and integrity of applications and data within a computer system is of growing importance. Various known security techniques fail to adequately secure applications and data in a flexible but reliable manner.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
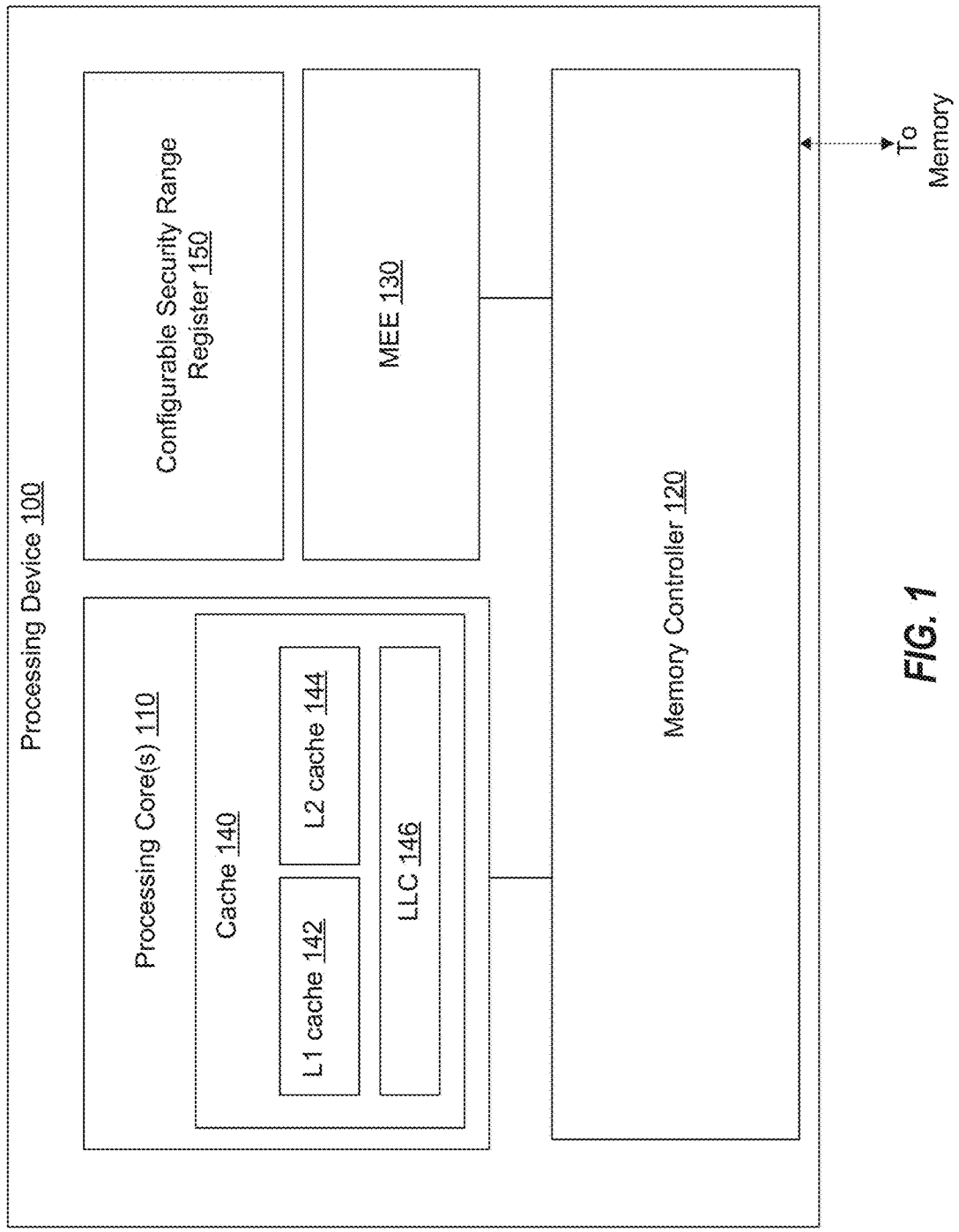
FIG. 1 illustrates a block diagram of a processing device according to one embodiment.

Techniques for supporting configurable security levels for memory address ranges are described. In one embodiment, a processor is provided. The processor may comprise processing logic configured to implement Software Guard Extension (SGX®) technology to provide memory protection. "Memory protection" may generally comprise protecting the confidentiality of data via encryption, integrity and/or replay protection. Integrity protection may defend against attacks wherein, for example, an attacker may modify encrypted data in memory prior to decryption. Replay protection may prevent attacks wherein, for example, an attacker causes a decryption operation to be repeated to gain unauthorized access to protected data.

SGX® uses certain processor instructions that provide a secure, hardware-encrypted computation and storage environment (e.g., secure enclave). "Secure enclave" herein shall refer to a protected area within an application's address space that enable the application to keep secrets and protect the integrity of its code. Access to data associated with the secure enclave from applications not resident in the enclave is prevented even if such access is attempted by a privileged application such as BIOS, operating system or virtual machine monitor. Further to this point, the data contents of the secure enclave cannot be deciphered by privileged code or even through applying hardware probes to a memory bus.

SGX® may implement several techniques for protecting data of the secure enclave. In one embodiment, SGX® may use memory encryption engine (MEE) hardware for encryption of data as well as for integrity and replay protection of that data. The (MEE) may encrypt data which is moved to an untrusted system memory that may be external with respect to the processor. The MEE uses cryptographic mechanisms to encrypt data and other techniques to provide integrity and confidentiality when memory pages are stored in the system memory. When data are read from the system memory, the MEE decrypts and integrity checks the data and then places it into an internal cache of the processor.

To provide integrity protection of protected data, the MEE may store a message authentication code (MAC) value with each data line of the processor cache moved to the system memory. When the data line is read from the system memory, its integrity may be verified by calculating the MAC value of the data line and comparing the calculated MAC value with the stored MAC value. In certain implementations, the MAC is stored in the system memory, and thus also needs to be protected from being accessed or tampered with. Replay protection may be further provided by the processor by storing the version (VER) of the data line which is incremented each time when the data line is written back to the system memory.

To protect the MAC and VER values themselves, a replay protection tree comprising a plurality of nodes may be employed. Each node of the tree is verified by an embedded MAC (eMAC) calculated based on the node contents and a value of a counter that is stored on the next level of the tree. Values of MAC, VER and counters may be collectively referred to herein as "encryption metadata." The replay protection tree may have a variable number of levels that include a type of counter at each level. To ensure the replay protection, each data line read from the external memory is verified by walking the tree starting from a terminal node that stores the VER value for the data line. The number of levels in the replay protection tree grows linearly with the size of the protected memory region. For example, to protect a 64 GB memory region, a seven-level tree may be utilized, thus requiring a top-level counter of 8 KB. Hence, for each read of a data line, seven additional memory lines would need to be loaded from the system memory, thus creating an overhead of seven times the amount of data memory bandwidth needed as compared to what would be needed for an unprotected memory read.

In some situations, various systems can demand a high amount of memory bandwidth. For example, some system applications may call for a high rate of data to move back and forth from memory. In addition, some systems may have usage models that need for an entire application to be run within a secure enclave. In such cases, system performance is highly dependent on the amount of memory bandwidth available to the applications, which can be impacted by the bandwidth requirements associated with the replay protection tree.

Embodiments of the present disclosure provide a mechanism to allow a user, such as a system administrator, to configure a balance between security and performance. In some embodiments, a security range register may be configured in order to minimize the bandwidth and performance impact of protecting data using the replay protection tree. In one embodiment, the security range register may comprise security level indicators that may be used to divide a total range of protected memory into at least two sub categories: 1) an encryption only range, and 2) a full protection range. In the full protection range, the processor may use encryption hardware, such as the MEE, to provide encryption, integrity and reply protection. In the encryption only range, the encryption hardware may be used to only encrypt the data lines before sending them to memory. As the encryption hardware does not need to access encryption metadata (e.g., MAC and VER data), it may not significantly impact bandwidth utilization of the processor, thereby increasing system performance.

FIG. 1 illustrates a block diagram of a processing device 100, which may support configurable security range functionality according to one embodiment. The processing device 100 may be generally referred to as "processor" or "CPU". "Processor" or "CPU" herein shall refer to a device capable of executing instructions encoding arithmetic, logical, or I/O operations. In one illustrative example, a processor may include an arithmetic logic unit (ALU), a control unit, and a plurality of registers. In a further aspect, a processor may include one or more processing cores, and hence may be a single core processor which is typically capable of processing a single instruction pipeline, or a multi-core processor which may simultaneously process multiple instruction pipelines. In another aspect, a processor may be implemented as a single integrated circuit, two or more integrated circuits, or may be a component of a multi-chip module (e.g., in which individual microprocessor dies are included in a single integrated circuit package and hence share a single socket).

As shown in FIG. 1, processing device 100 may include various components. In one embodiment, processing device 100 may include one or more processors cores 110 and a memory controller unit 120, among other components, coupled to each other as shown. The processing device 100 may also include a communication component (not shown) that may be used for point-to-point communication between various components of the processing device 100. The processing device 100 may be used in a computing system (not shown) that includes, but is not limited to, a desktop computer, a tablet computer, a laptop computer, a netbook, a notebook computer, a personal digital assistant (PDA), a server, a workstation, a cellular telephone, a mobile computing device, a smart phone, an Internet appliance or any other type of computing device. In another embodiment, the processing device 100 may be used in a system on a chip (SoC) system. In one embodiment, the SoC may comprise processing device 100 and a memory. The memory for one such system is a DRAM memory. The DRAM memory can be located on the same chip as the processor and other system components. Additionally, other logic blocks such as a memory controller or graphics controller can also be located on the chip.

The processor core(s) 110 may execute instructions of the processing device 100. The instructions may include, but are not limited to, pre-fetch logic to fetch instructions, decode logic to decode the instructions, execution logic to execute instructions and the like. The computing system may be representative of processing systems based on the Pentium® family of processors and/or microprocessors available from Intel® Corporation of Santa Clara, Calif., although other systems (including computing devices having other microprocessors, engineering workstations, set-top boxes and the like) may also be used. In one embodiment, a sample computing system may execute a version of an operating system, embedded software, and/or graphical user interfaces. Thus, embodiments of the disclosure are not limited to any specific combination of hardware circuitry and software.

In an illustrative example, processing core 110 may have a micro-architecture including processor logic and circuits used to implement an instruction set architecture (ISA). Processor cores with different micro-architectures can share at least a portion of a common instruction set. For example, the same register architecture of the ISA may be implemented in different ways in different micro-architectures using various techniques, including dedicated physical registers, one or more dynamically allocated physical registers using a register renaming mechanism (e.g., the use of a register alias table (RAT), a reorder buffer (ROB) and a retirement register file).

Memory controller 120 may perform functions that enable the processing device 100 to access and communicate with memory (not shown) that includes a volatile memory and/or a non-volatile memory. In one embodiment, the memory controller 120 may be coupled to, among other things, a memory encryption engine (MEE) 130. The MEE 130 herein shall refer to a hardware-implemented processing logic that encrypts data traffic between the processing device 100 and memory, such as random access memory (SRAM) or dynamic random access memory (DRAM) off the processor chip. In some embodiments, the MEE 130 may be located on a processor die associated with processing device 100, while the memory is located off the processor die.

The processing device 100 includes a cache unit 140 to cache instructions and/or data. The cache unit 140 includes, but is not limited to, a level one (L1) 142, level two (L2) 144, and a last level cache (LLC) 146, or any other configuration of the cache memory within the processing device 100. As shown, the cache unit 140 can be integrated into the processing cores 110. The cache unit 140 may store data (e.g., including instructions) that are utilized by one or more components of the processing device 100. For example, the cache unit 140 may locally cache data for faster access by the components of the processing device 100. In some embodiments, the L1 cache 142 and L2 cache 144 can transfer data to and from the LLC 146. In one embodiment, the memory controller 120 can be connected to the LLC 146 and to the MEE 130. The memory controller 120 can assess protected data residing on a memory that may be external to the processing device 100.

In some embodiments, processing device 100 may utilize SGX® technology to protect at least a portion of memory in a secured environment. In one embodiment, the processing device 100 may support a secure enclave (not shown) that may represent any logic, circuitry, hardware, such as MEE 130, or other structures executed by the processing cores 110 for creating and maintaining the secured environment for the portion of memory. Each instance of such an environment may be referred to as a secure enclave, although embodiments of the present invention are not limited to those using a secure enclave as the secured environment. In one embodiment, a secure enclave may be created and maintained using SGX® instructions in the instruction set of a processor in the Intel® Core® Processor Family or other processor family from Intel® Corporation.

The processing device 100 may implement several techniques for protecting memory data associated with the secure enclave. In one example, the processing device 100 may implement a protection mechanism using the MEE 130. For example, the MEE 130 may protect cache data lines that gets evicted out of the processing device 100 and moved to memory if they belong to the secure enclave. In one embodiment, the MEE 130 may use encryption of the cache lines to defend against passive attacks, e.g. where an attacker attempts to silently observe data lines as they move in and out of processing device 100. For example, to encrypt the cache lines, the MEE 130 may implement an algorithm that may perform a series of transformations using a secret key (e.g., cipher key) to transform intelligible data referred to as "plaintext" into an unintelligible form referred to as "cipher text." In this example, decryption (inverse cipher) may perform by the MEE in a series of transformations using the cipher key to transform the cipher text back into plaintext. This is merely one example as other types of encryption logic may be implemented by the MEE 130.

In another embodiment, to provide integrity/replay protection to defend against active attacks (where an attacker may change data stored in memory in order to elicit activity in processing device 100 that would otherwise not have happened), the MEE 130 may perform a counter mode encryption technique, which requires an encryption seed to be unique for a data line both temporally and spatially. Spatial uniqueness can be achieved by using the address of the data line to be accessed, while temporal uniqueness can be achieved by using a counter that serves as the version of the data line. In one embodiment, the MEE 130 also protects the data lines using a counter tree structure in which only the root of the tree is stored on-die and forms the root of trust (i.e., a trust boundary). The versions of the data lines are part of this counter tree structure. Alternatively, other protection mechanisms may be used for replay-protection. For example, MACs associated with the secure cache lines can be stored on-die, since a successful replay attack would need to replay both the data line and its associated MAC.

In some embodiments, the processing device 100 may include a mechanism to divide the protected memory into two categories that include a first security level and a second security level. For example, the first security level may indicate a range of memory that is protected using encryption only while the second security level may indicate a range of memory that is protected using encryption metadata generated by the MEE 130. In one embodiment, configurable security range register 150 may be utilized to divide the protected memory into at least two sub-categories. The configurable security range register 150 may be storage hardware available as part of the processing device 100. In one embodiment, the configurable security range register 150 may include a set of security level indicators (e.g., an array, tree, other registers or various types of data structures, etc.) that can be configured or otherwise programmed with one or more values to specify memory ranges that divide the system memory into sub-categories. The configurable security range register 150 may work in conjunction with ISA architecture of the processing device 100. In one embodiment, the secure enclave may set the values of the configurable security range register 150 when it launches and sets a lock bit in the register 150, which prevents the values from being subsequently changed, for example, unless a reboot occurs.

Figure 2:
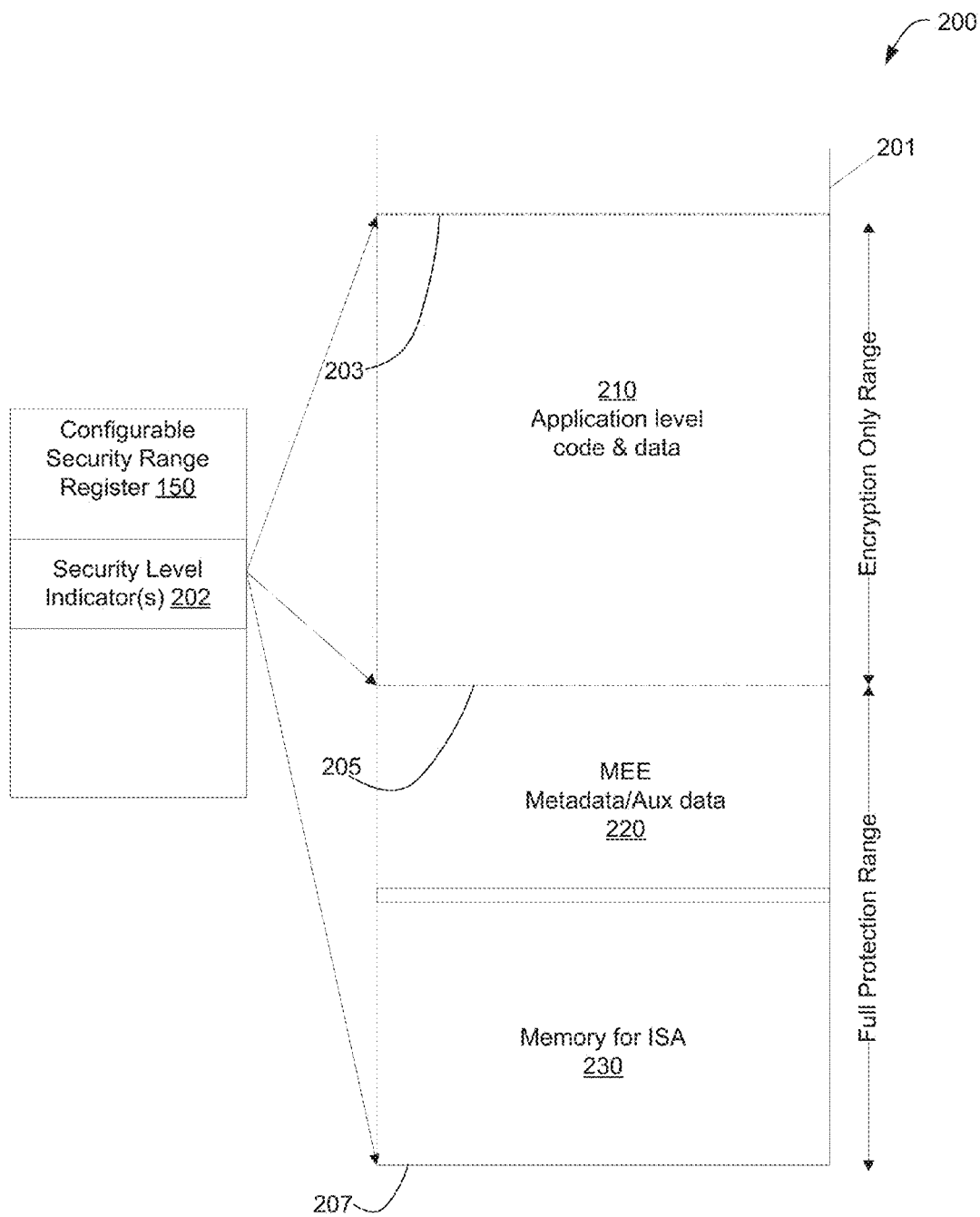
FIG. 2 illustrates a system including system including a memory for supporting configurable security levels for memory address ranges according to one embodiment.

FIG. 2 illustrates a system 200 including a memory 201 for supporting configurable security levels for memory address ranges according to one embodiment. In this example, the memory 201 includes a protected address range that is divided into security level sub-categories, such as full protection range (e.g., encrypting data using MEE 130 generated encryption metadata) and encryption only range (e.g., encrypting data without generating encryption metadata). As noted above, configurable security range register 150 of processing device 100 may include security level indicators 202 to identify which memory ranges of memory 201 are being protected at either of the full protection range or encryption only range. In some embodiments, the security level indicators 202 may include, but not limited to, data arrays, trees, other registers or different types of data structures that can be set to a value, such as a memory address.

In some embodiments, the security level indicators 202 of the configurable security range register 150 may be programmed in several ways to identify security levels associated with memory ranges in memory 201. In one embodiment, the security range register 150 may be configured to explicitly identify the encryption only range of protected. Hence, any data item stored in a location outside of this range may receive full protection. For example, the security level indicators 202 of security range register 150 may include a data structure that can be set to memory location addresses corresponding to a beginning memory address 203 and ending memory address 205 of the encryption only memory range, such as memory range 210. This configuration may identify for the processing device 100 an encryption only range of memory for any data saved within this range. In this regard, data saved in this range may be encrypt/decrypt using encryption logic (e.g., cipher text). While data saved in a memory location outside of this range, such as memory ranges 220 and 230 may be fully protected using encryption metadata generated by MEE 130.

In another embodiment, the security level indicators 202 may include data structures set to memory address identifying a boundary between the sub-ranges. For example, the security level indicators 202 may include data structures may be set to memory addresses 203, 205 and 207 with each memory address indicating a beginning and ending boundary for the sub-ranges. In this example, the security level indicators 202 may also include values indicating, for example, the sub range between memory addresses 203 and 205 may be an encryption only range and/or that the sub range between memory addresses 205 and 207 may be a full protection range of protected memory.

In yet another embodiment, the security level indicators 202 may include a data structure set to a memory address identifying a boundary point in memory 201 that divides the memory 201 into security level sub-ranges. For example, the data structure may include a value corresponding to memory address 203 that may divide a protect range of memory 201 into an encryption only range and a full protection range. In this example, the security level indicators 202 may include a direction bit that may configured to identify which side of the boundary is the encryption only range and which is the full protection range. Data either moved to or from these identified ranges may be encrypted according to the values set in the security level indicators 202. Still further, other techniques may be employed to utilize the security level indicators 202 of the configurable security range register 150 to identify different security level sub-ranges of the protect range of memory 201.

As shown in FIG. 2, protected application code and data, such as application/data associated with a secure enclave, may be protected using encryption logic of processing device 100. For example, any data line evicted out of the processor chip that belongs to this memory location will be encrypted (e.g., cipher text) by the processor encryption logic before being stored in memory 201 and subsequently decrypted before it is returned to the processor cores 110. As such, extra storage and retrieval of encryption metadata used by the full protection range are not needed. Though the encrypted data/cipher text keeps the confidentiality of data it does not protect memory from active attacks or replay attacks. Attacker, however, cannot intelligibly read the data. In addition, the data may be protected by certain SGX®-ISA instructions that protect the data from many software attacks and the range (e.g., memory range 230) used by the ISA is stored under full protection range to avoid any active attack or replay attacks on that range of memory.

In some embodiments, the full protection range may be configured so as to occupy a certain percentage (e.g., less than 10 percent) of a total range of memory 201 being protected. This certain percentage may be configured in order to conserve memory bandwidth. For example, if the total protection range comprises 64 GB of memory, the full protection range may comprise 1 GB of this memory while the encryption only range may comprises 63 GB. In some embodiments, all memory that controls running of the ISA is located in this full protection range (e.g., memory range 230). This may ensure that when multiple threads are running in that range of memory they will have temporal and spatial locality. Temporal locality refers to multiple accesses of specific memory locations within a relatively small time period. Spatial locality refers to accesses of relatively close memory locations within a relatively small time period.

In some embodiments, memory located in the full protection range may be fully protected using encryption metadata. In one embodiment, the MEE 130 may generate the encryption metadata for integrity and replay protection of that data on top of protecting the confidentiality of the data. Thereafter, the MEE 130 may store the encryption metadata in a location located in the full protection range, such as in memory range 220. An example of a data structure (e.g., replay protection tree) used for storing the encryption metadata is discussed below with respect to FIG. 3.

Figure 3:
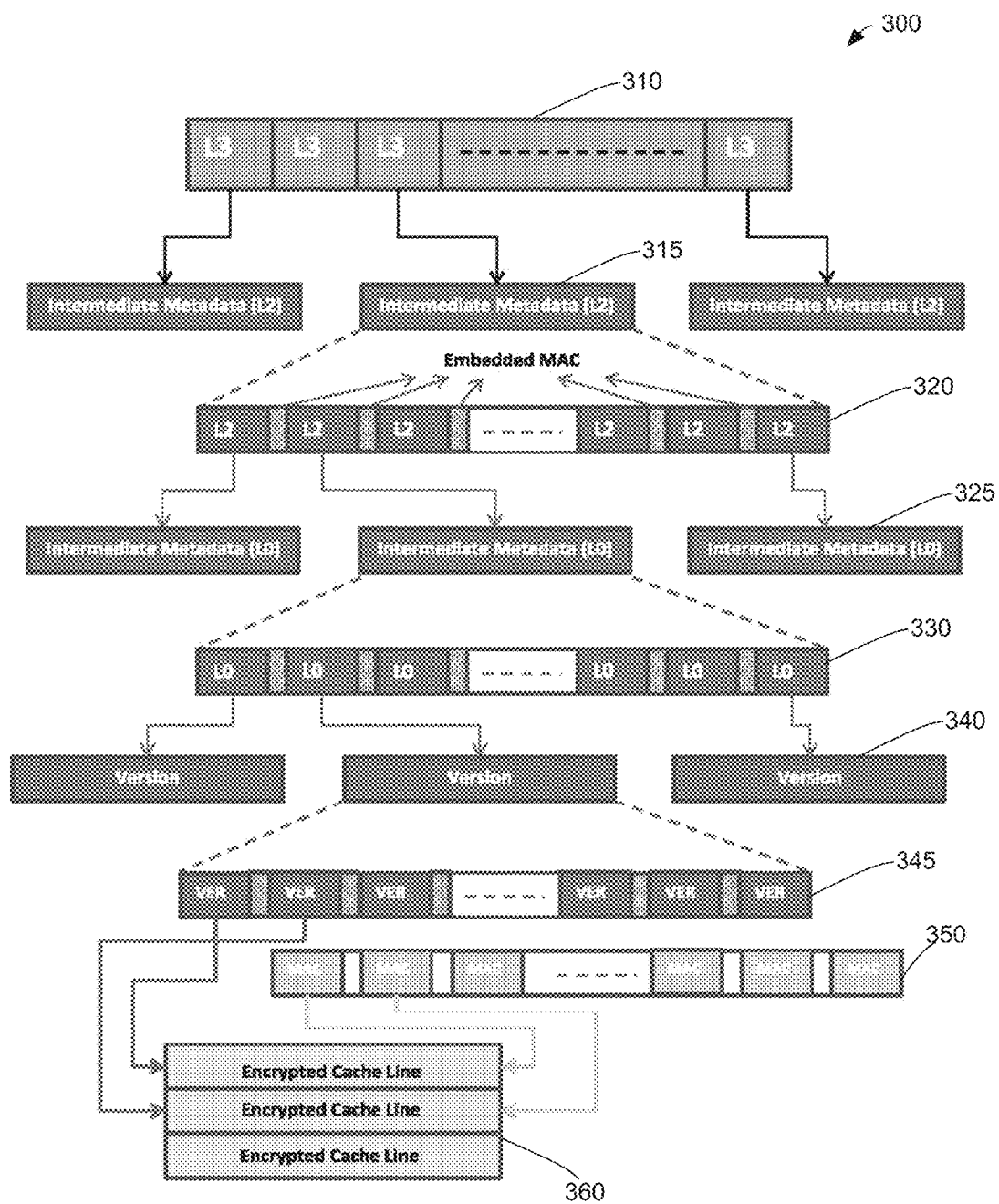
FIG. 3 schematically illustrates example data structure employed for storing encryption metadata to implement integrity and replay protections in accordance with one or more aspects of the present disclosure.

FIG. 3 schematically illustrates an example data structure 300 employed for storing encryption metadata to implement integrity and replay protections in accordance with one or more aspects of the present disclosure. In this example, the data structure 300 may comprises a replay protection tree generated, for example, by the MEE 130 of processing device 100. The replay protection tree structure includes a hierarchy of levels of tree nodes. The top (root) level includes a sequence of on-die counters (i.e., L3 counters 310), which are stored in the internal storage of the processor die associated with processing device 100. The internal storage includes, but is not limited to, the on-die Static Random Access Memory (SRAM), register files, and any other suitable memory in the processor die. As the L3 counters 310 are on the processor die, their contents are trusted and secure from passive and active attacks.

In one embodiment, each L3 counter 310 is linked to a block of L2 intermediate metadata 315, which contains a sequence of L2 counters 320. Each L2 counter 320 is linked to a block of L1 intermediate metadata (not shown), which contains a sequence of L1 counters (not shown). In this example, the blocks representing the L1 intermediate metadata and the L1 counters are omitted from FIG. 3 for simplicity of illustration. Each L1 counter is linked to a block of L0 intermediate metadata 325, which contains a sequence of L0 counters 330. Each L0 counter 330 is linked to a version block 340, which contains a sequence of version nodes 345. Each version node 345 is associated with an encrypted data line 360 in a protected region of the memory 201. The content of a version node 345 is the version of the associated data line, which provides a temporal component of the encryption seed in the counter mode encryption. As the lower-level counters (including L2, L1 and L0 counters and the version nodes 345) are off the processor die and therefore are susceptible to attacks, each counter and each version node are encoded with an embedded Message Authentication Code (MAC) (shown as the blocks with hatched lines) to ensure their integrity.

Before a data line moves to memory 201, it may be encrypted by MEE 130. For reads from memory, encrypted data lines 360 may be decrypted by MEE 130 prior to being delivered to the processing cores 110. Each encrypted data line 360 is encoded with a MAC node 350 containing a MAC computed from the content of the data line 360. Each time the data line is written back to memory, MEE 130 updates this MAC to reflect the most recent data value stored in memory 201. When a data line is read from memory 201, MEE 130 verifies its integrity by calculating the MAC value of the data line and comparing the calculated MAC value with the stored MAC value. Replay protection may be further provided by storing, for each data line, its version (VER) value 345 which is incremented each time when the data line is written back to memory 201.

When processing device 100 executes a write operation to write one of the encrypted data lines 360 into the protected memory region residing on memory 201 (e.g., when evicting a data line from an on-die LLC 146 to the protected region in the memory 201), MEE 130 updates MAC 350 associated with the data line and increments version 345 of that data line and the L0, L1, L2 and L3 counters (310, 320, 330) associated with that data line. This update process proceeds from the bottom level of the counter tree up to the root level of L3 counters, which are stored securely on the chip on the processor die and hence are guaranteed protection against attacks. The counters at each level of the counter tree act as the versions for the next lower level ending with the version nodes 345 storing the versions for the data lines. Hence, on a write to a data line, all of counters (including the version) and their associated embedded MACs along the branch identified by the data line's address are updated to reflect the version update.

In order to ensure replay protection, each time a data line is loaded from the protected region it is verified for authenticity against the tree nodes up to the root of the counter tree. A mismatch at any level indicates a potential attack and raises a security exception, thereby defeating the attack. Specifically, when the processing device 100 executes a read operation on one of the encrypted data lines 360, the MEE 130 identifies the version and the L0, L1, L2 and L3 counters (310, 320, 330) of that data line. Read operations do not alter the values of the version and the L0, L1, L2 and L3 counters (310, 320, 330). Upon a read operation, the MEE 130 verifies the MAC 350 associated with the data line. In addition, the MEE 130 verifies the embedded MAC associated with each of the version, L0, L1, L2 and L3 counters (310, 320, 330). This verification process proceeds from the bottom level of the counter tree up to the secure root counter L3.

Figure 4:
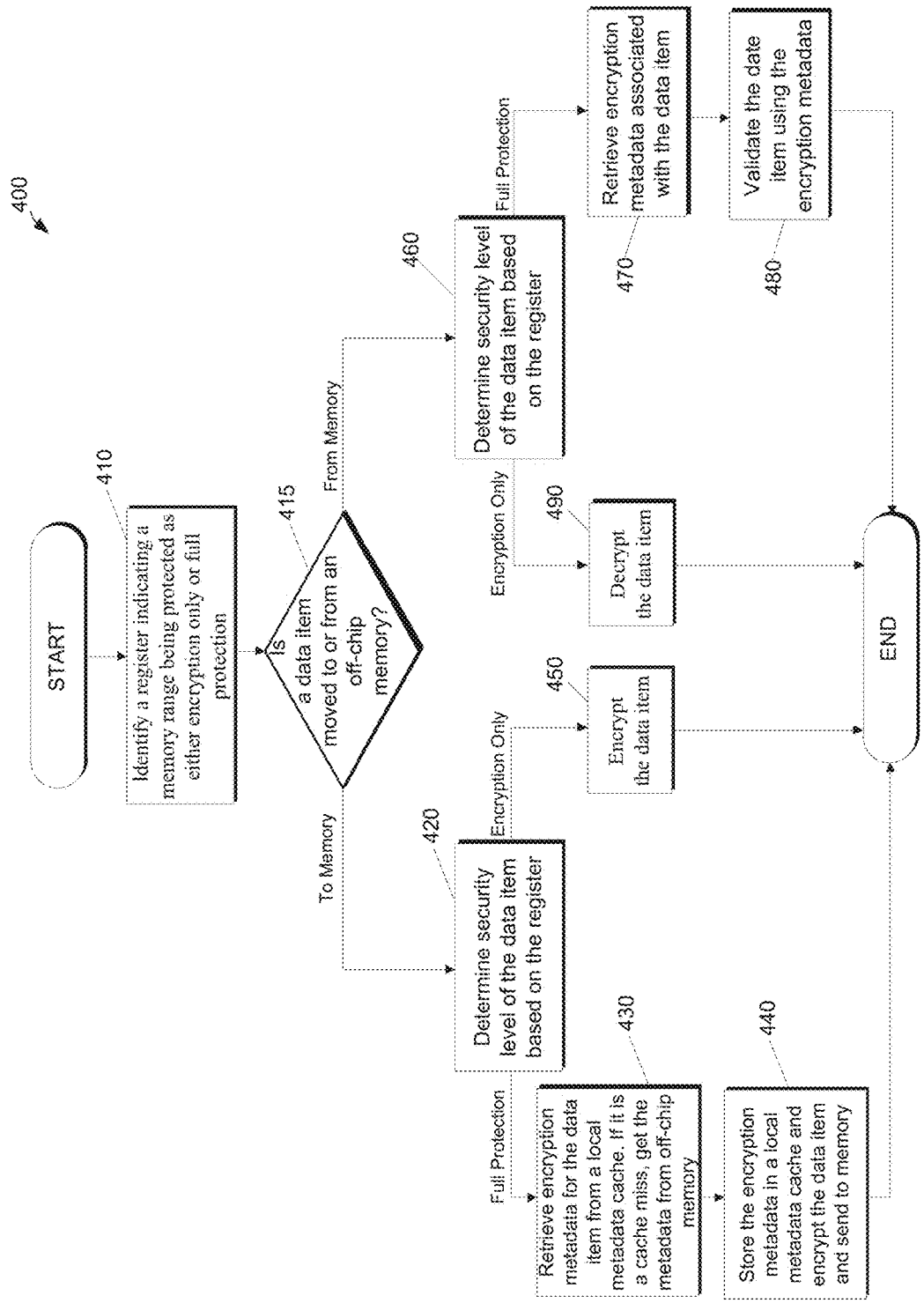
FIG. 4 illustrates a flow diagram of a method for supporting configurable security levels for memory address ranges according to one embodiment.

FIG. 4 illustrates a flow diagram of a method for supporting configurable security levels for memory address ranges according to one embodiment. Method 400 may be performed by processing logic that may comprise hardware (e.g., circuitry, dedicated logic, programmable logic, microcode, etc.), software (such as instructions run on a processing device), firmware, or a combination thereof. In one embodiment, processor cores 110 of processing device 100 may perform method 400. Although shown in a particular sequence or order, unless otherwise specified, the order of the processes can be modified. Thus, the illustrated implementations should be understood only as examples, and the illustrated processes can be performed in a different order, and some processes may be performed in parallel. Additionally, one or more processes can be omitted in various embodiments. Thus, not all processes are required in every implementation. Other process flows are possible.

Method 400 begins at block 410 where a register indicating a memory range being protected as either as encryption only or full protection may be identified. For example, security level indicators 202 in configurable security range register 150 may be identified by processing device 100. As noted above, the set of indicators 202 may include one or more data structures that are set to a value to indicate whether memory data is being protected as encryption only protection or full protection. At block 415, method 400 branches depending on whether a data item is being moved to or from an off-chip memory. If the data item is being moved to memory, method 400 may proceed to block 420. Otherwise, method 400 proceeds to block 460.

At block 420, method 400 determines the security level of the data item being moved into memory based on the register identified at block 410. If it is determined that the data item is being moved to the full protection range of memory, method 400 may process to block 430. Otherwise, method 400 proceeds to block 450. At block 430, encryption hardware of the processing device 100, such as MEE 130, may retrieve encryption metadata for the data item from a local metadata cache. If a cache miss occurs, the encryption hardware may get the metadata from an off-chip memory. At block 440, the encryption metadata may be stored in a local metadata cache and the data item may be encrypted and sent to memory. If it is determined that the data item is being moved to the encryption only protection range of memory, the encryption hardware of processing device 100 is used to encrypt the data item at block 450 without generating encryption metadata.

At block 460, method 400 determines the security level of the data item being read from memory based on the register identified at block 410. If it is determined that the data item is being read from the full protection range of memory, method 400 may process to block 470. Otherwise, method 400 proceeds to block 490. At block 470, MEE 130 retrieves encryption metadata for the data item from memory and validates the data item using the encryption metadata at block 480. If it is determined that the data item is being read from the encryption only protection range of memory, the processing device 100 uses the encryption hardware to decrypt the data item at block 490.

Figure 5A:
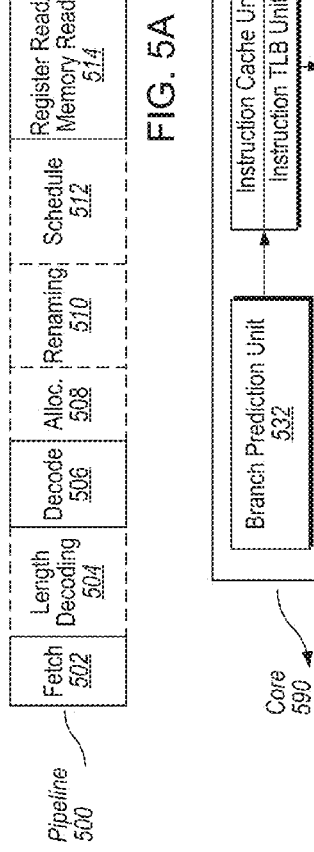
FIG. 5A is a block diagram illustrating a micro-architecture for a processor according to one embodiment.

FIG. 5A is a block diagram illustrating a micro-architecture for a processor 500 that implements techniques for supporting configurable security levels for memory address ranges in accordance with one embodiment of the disclosure. Specifically, processor 500 depicts an in-order architecture core and a register renaming logic, out-of-order issue/execution logic to be included in a processor according to at least one embodiment of the disclosure.

Processor 500 includes a front end unit 530 coupled to an execution engine unit 550, and both are coupled to a memory unit 570. The processor 500 may include a reduced instruction set computing (RISC) core, a complex instruction set computing (CISC) core, a very long instruction word (VLIW) core, or a hybrid or alternative core type. As yet another option, processor 500 may include a special-purpose core, such as, for example, a network or communication core, compression engine, graphics core, or the like. In one embodiment, processor 500 may be a multi-core processor or may part of a multi-processor system.

The front end unit 530 includes a branch prediction unit 532 coupled to an instruction cache unit 534, which is coupled to an instruction translation lookaside buffer (TLB) 536, which is coupled to an instruction fetch unit 538, which is coupled to a decode unit 540. The decode unit 540 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 540 may be implemented using various different mechanisms. Examples of suitable mechanisms include, but are not limited to, look-up tables, hardware implementations, programmable logic arrays (PLAs), microcode read only memories (ROMs), etc. The instruction cache unit 534 is further coupled to the memory unit 570. The decode unit 540 is coupled to a rename/allocator unit 552 in the execution engine unit 550.

The execution engine unit 550 includes the rename/allocator unit 552 coupled to a retirement unit 554 and a set of one or more scheduler unit(s) 556. The scheduler unit(s) 556 represents any number of different schedulers, including reservations stations (RS), central instruction window, etc. The scheduler unit(s) 556 is coupled to the physical register file(s) unit(s) 558. Each of the physical register file(s) units 558 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 558 is overlapped by the retirement unit 554 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.). The execution engine unit 550 may include for example a power management unit (PMU) 590 that governs power functions of the functional units.

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 554 and the physical register file(s) unit(s) 558 are coupled to the execution cluster(s) 560. The execution cluster(s) 560 includes a set of one or more execution units 562 and a set of one or more memory access units 564. The execution units 562 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 556, physical register file(s) unit(s) 558, and execution cluster(s) 560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 564). It should also be understood that where separate pipelines are used, one or more of these pipelines may be out-of-order issue/execution and the rest in-order.

The set of memory access units 564 is coupled to the memory unit 570, which may include a data prefetcher 580, a data TLB unit 572, a data cache unit (DCU) 574, and a level 2 (L2) cache unit 576, to name a few examples. In some embodiments DCU 574 is also known as a first level data cache (L1 cache). The DCU 574 may handle multiple outstanding cache misses and continue to service incoming stores and loads. It also supports maintaining cache coherency. The data TLB unit 572 is a cache used to improve virtual address translation speed by mapping virtual and physical address spaces. In one exemplary embodiment, the memory access units 564 may include a load unit, a store address unit, and a store data unit, each of which is coupled to the data TLB unit 572 in the memory unit 570. The L2 cache unit 576 may be coupled to one or more other levels of cache and eventually to a main memory.

In one embodiment, the data prefetcher 580 speculatively loads/prefetches data to the DCU 574 by automatically predicting which data a program is about to consume. Prefeteching may refer to transferring data stored in one memory location of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

In one implementation, processor 500 may be the same as processing device 100 described with respect to FIG. 1. In particular, the data TLB unit 572 may be the same as TLB 155 and described with respect to FIG. 1, to implement techniques for supporting configurable security levels for memory address ranges in a processing device described with respect to implementations of the disclosure.

The processor 500 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 5B:
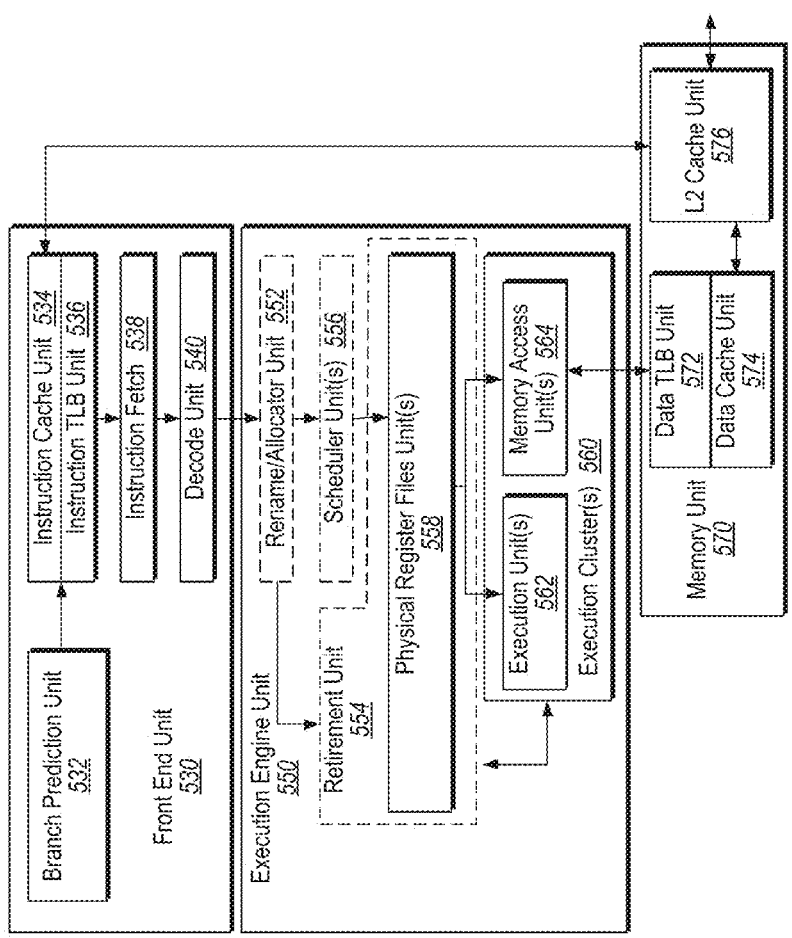
FIG. 5B is a block diagram illustrating an in-order pipeline and a register renaming stage, out-of-order issue/execution pipeline according to one embodiment.

FIG. 5B is a block diagram illustrating an in-order pipeline and a register renaming stage, out-of-order issue/execution pipeline implemented by processor 500 of FIG. 5A according to some embodiments of the disclosure. The solid lined boxes in FIG. 5B illustrate an in-order pipeline, while the dashed lined boxes illustrates a register renaming, out-of-order issue/execution pipeline. In FIG. 5B, a processor pipeline 501 includes a fetch stage 502, a length decode stage 504, a decode stage 506, an allocation stage 508, a renaming stage 510, a scheduling (also known as a dispatch or issue) stage 512, a register read/memory read stage 514, an execute stage 516, a write back/memory write stage 518, an exception handling stage 522, and a commit stage 524. In some embodiments, the ordering of stages 502-524 may be different than illustrated and are not limited to the specific ordering shown in FIG. 5B.

Figure 6:
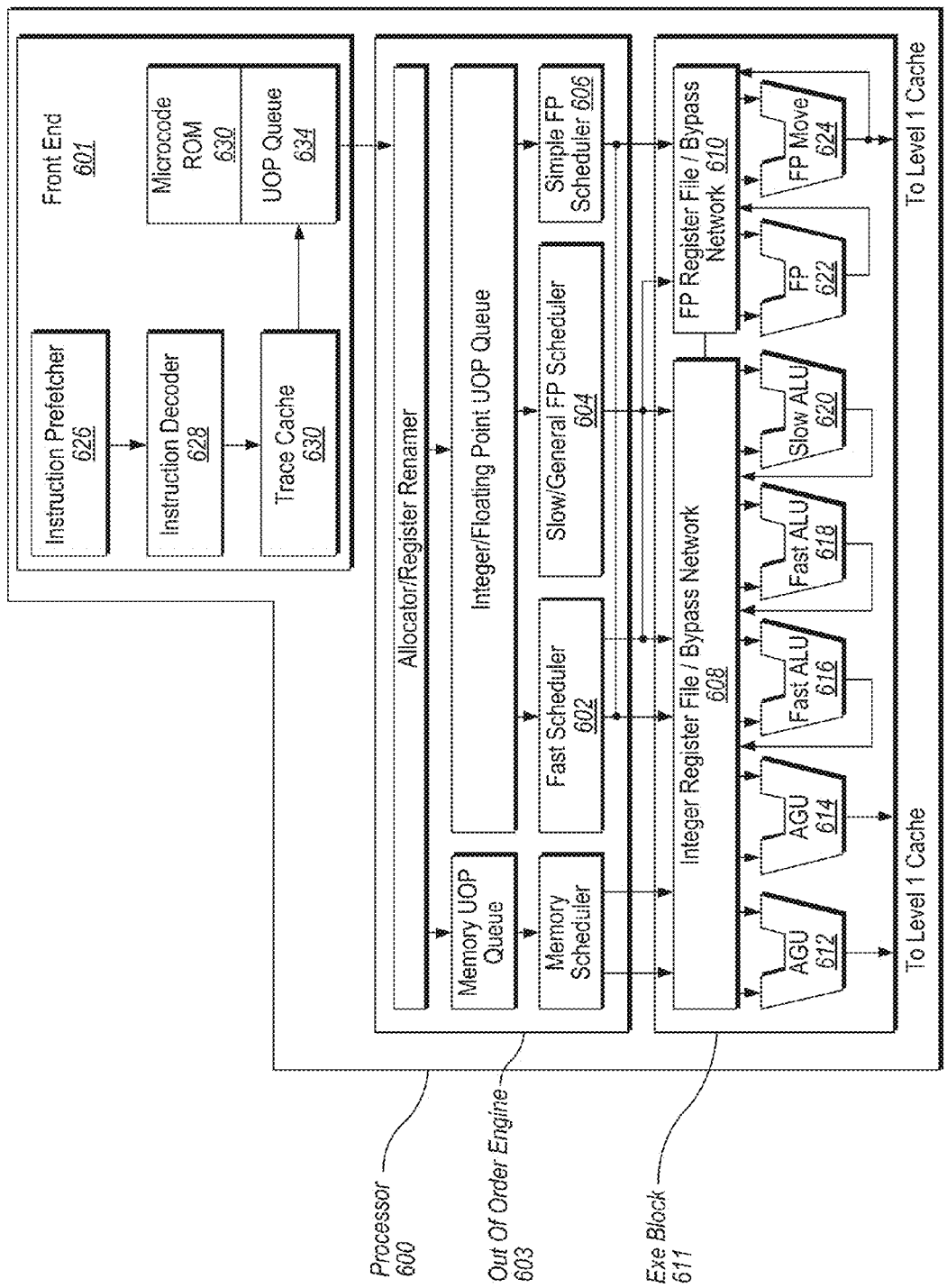
FIG. 6 is a block diagram illustrating a computer system according to one implementation.

FIG. 6 illustrates a block diagram of the micro-architecture for a processor 600 that includes logic circuits to implement techniques for supporting configurable security levels for memory address ranges in accordance with one embodiment of the disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 601 is the part of the processor 600 that fetches instructions to be executed and prepares them to be used later in the processor pipeline.

The front end 601 may include several units. In one embodiment, the instruction prefetcher 626 fetches instructions from memory and feeds them to an instruction decoder 628 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 630 takes decoded uops and assembles them into program ordered sequences or traces in the uop queue 634 for execution. When the trace cache 630 encounters a complex instruction, the microcode ROM 632 provides the uops needed to complete the operation.

Some instructions are converted into a single micro-op, whereas others need several micro-ops to complete the full operation. In one embodiment, if more than four micro-ops are needed to complete an instruction, the decoder 628 accesses the microcode ROM 632 to do the instruction. For one embodiment, an instruction can be decoded into a small number of micro ops for processing at the instruction decoder 628. In another embodiment, an instruction can be stored within the microcode ROM 632 should a number of micro-ops be needed to accomplish the operation. The trace cache 630 refers to an entry point programmable logic array (PLA) to determine a correct micro-instruction pointer for reading the micro-code sequences to complete one or more instructions in accordance with one embodiment from the micro-code ROM 632. After the microcode ROM 632 finishes sequencing micro-ops for an instruction, the front end 601 of the machine resumes fetching micro-ops from the trace cache 630.

The out-of-order execution engine 603 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 602, slow/general floating point scheduler 604, and simple floating point scheduler 606. The uop schedulers 602, 604, 606, determine when a uop is ready to execute based on the readiness of their dependent input register operand sources and the availability of the execution resources the uops need to complete their operation. The fast scheduler 602 of one embodiment can schedule on each half of the main clock cycle while the other schedulers can only schedule once per main processor clock cycle. The schedulers arbitrate for the dispatch ports to schedule uops for execution.

Register files 608, 610, sit between the schedulers 602, 604, 606, and the execution units 612, 614, 616, 618, 620, 622, 624 in the execution block 611. There is a separate register file 608, 610, for integer and floating point operations, respectively. Each register file 608, 610, of one embodiment also includes a bypass network that can bypass or forward just completed results that have not yet been written into the register file to new dependent uops. The integer register file 608 and the floating point register file 610 are also capable of communicating data with the other. For one embodiment, the integer register file 608 is split into two separate register files, one register file for the low order 32 bits of data and a second register file for the high order 32 bits of data. The floating point register file 610 of one embodiment has 128 bit wide entries because floating point instructions typically have operands from 64 to 128 bits in width.

The execution block 611 contains the execution units 612, 614, 616, 618, 620, 622, 624, where the instructions are actually executed. This section includes the register files 608, 610, that store the integer and floating point data operand values that the micro-instructions need to execute. The processor 600 of one embodiment is comprised of a number of execution units: address generation unit (AGU) 612, AGU 614, fast ALU 616, fast ALU 618, slow ALU 620, floating point ALU 622, floating point move unit 624. For one embodiment, the floating point execution blocks 622, 624, execute floating point, MMX, SIMD, and SSE, or other operations. The floating point ALU 622 of one embodiment includes a 64 bit by 64 bit floating point divider to execute divide, square root, and remainder micro-ops. For embodiments of the disclosure, instructions involving a floating point value may be handled with the floating point hardware.

In one embodiment, the ALU operations go to the high-speed ALU execution units 616, 618. The fast ALUs 616, 618, of one embodiment can execute fast operations with an effective latency of half a clock cycle. For one embodiment, most complex integer operations go to the slow ALU 620 as the slow ALU 620 includes integer execution hardware for long latency type of operations, such as a multiplier, shifts, flag logic, and branch processing. Memory load/store operations are executed by the AGUs 612, 614. For one embodiment, the integer ALUs 616, 618, 620, are described in the context of performing integer operations on 64 bit data operands. In alternative embodiments, the ALUs 616, 618, 620, can be implemented to support a variety of data bits including 16, 32, 128, 256, etc. Similarly, the floating point units 622, 624, can be implemented to support a range of operands having bits of various widths. For one embodiment, the floating point units 622, 624, can operate on 128 bits wide packed data operands in conjunction with SIMD and multimedia instructions.

In one embodiment, the uops schedulers 602, 604, 606, dispatch dependent operations before the parent load has finished executing. As uops are speculatively scheduled and executed in processor 600, the processor 600 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 600 also includes logic to implement store address prediction for memory disambiguation according to embodiments of the disclosure. In one embodiment, the execution block 611 of processor 600 may include a store address predictor (not shown) for implementing techniques for supporting configurable security levels for memory address ranges.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 7:
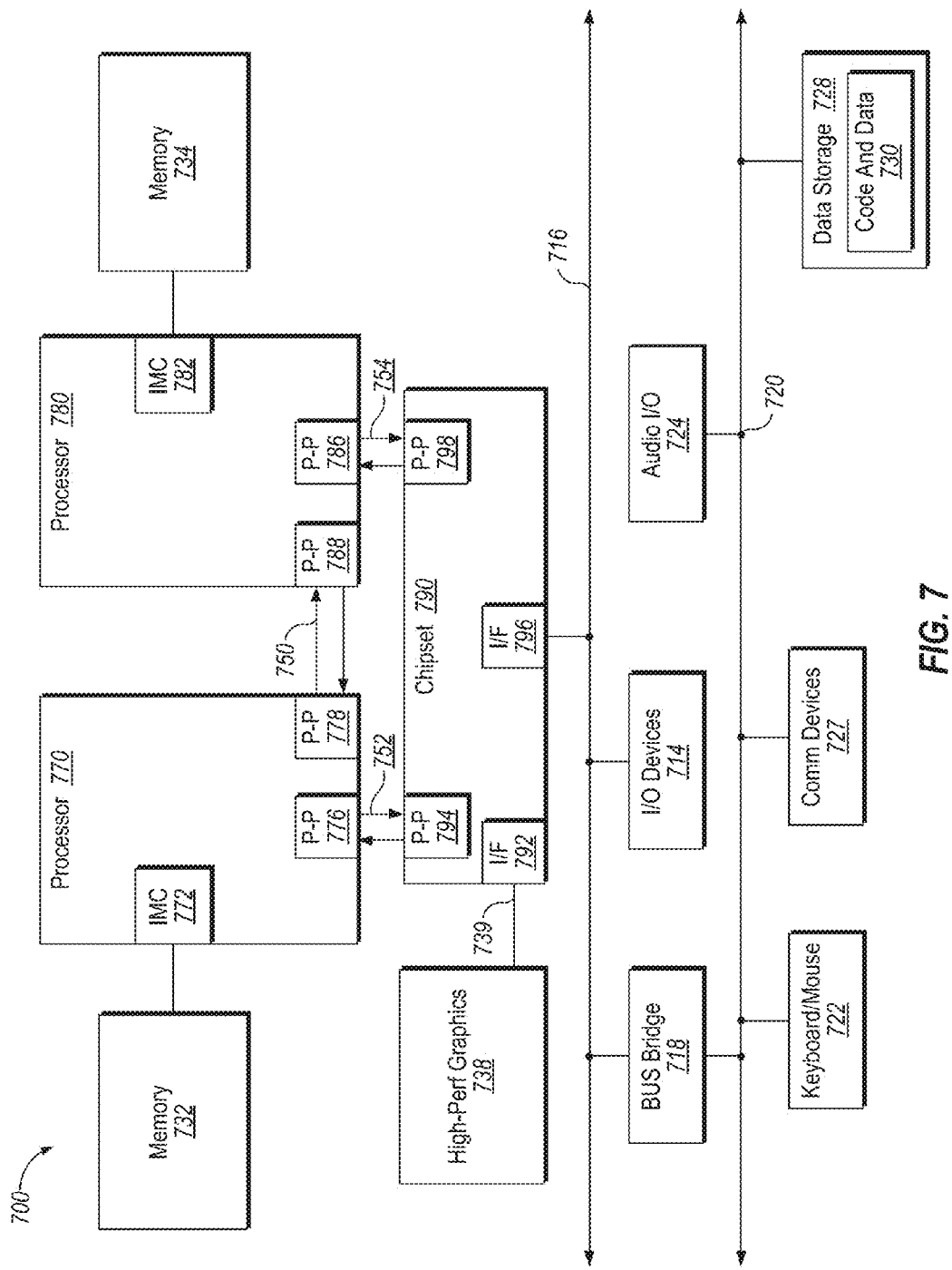
FIG. 7 is a block diagram illustrating a system in which an embodiment of the disclosure may be used.

Embodiments may be implemented in many different system types. Referring now to FIG. 7, shown is a block diagram illustrating a system 700 in which an embodiment of the disclosure may be used. As shown in FIG. 7, multi-processor system 700 is a point-to-point interconnect system, and includes a first processor 770 and a second processor 780 coupled via a point-to-point interconnect 750. While shown with only two processors 770, 780, it is to be understood that the scope of embodiments of the disclosure is not so limited. In other embodiments, one or more additional processors may be present in a given processor. In one embodiment, the multiprocessor system 700 may implement techniques for supporting configurable security levels for memory address ranges as described herein.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Figure 8:
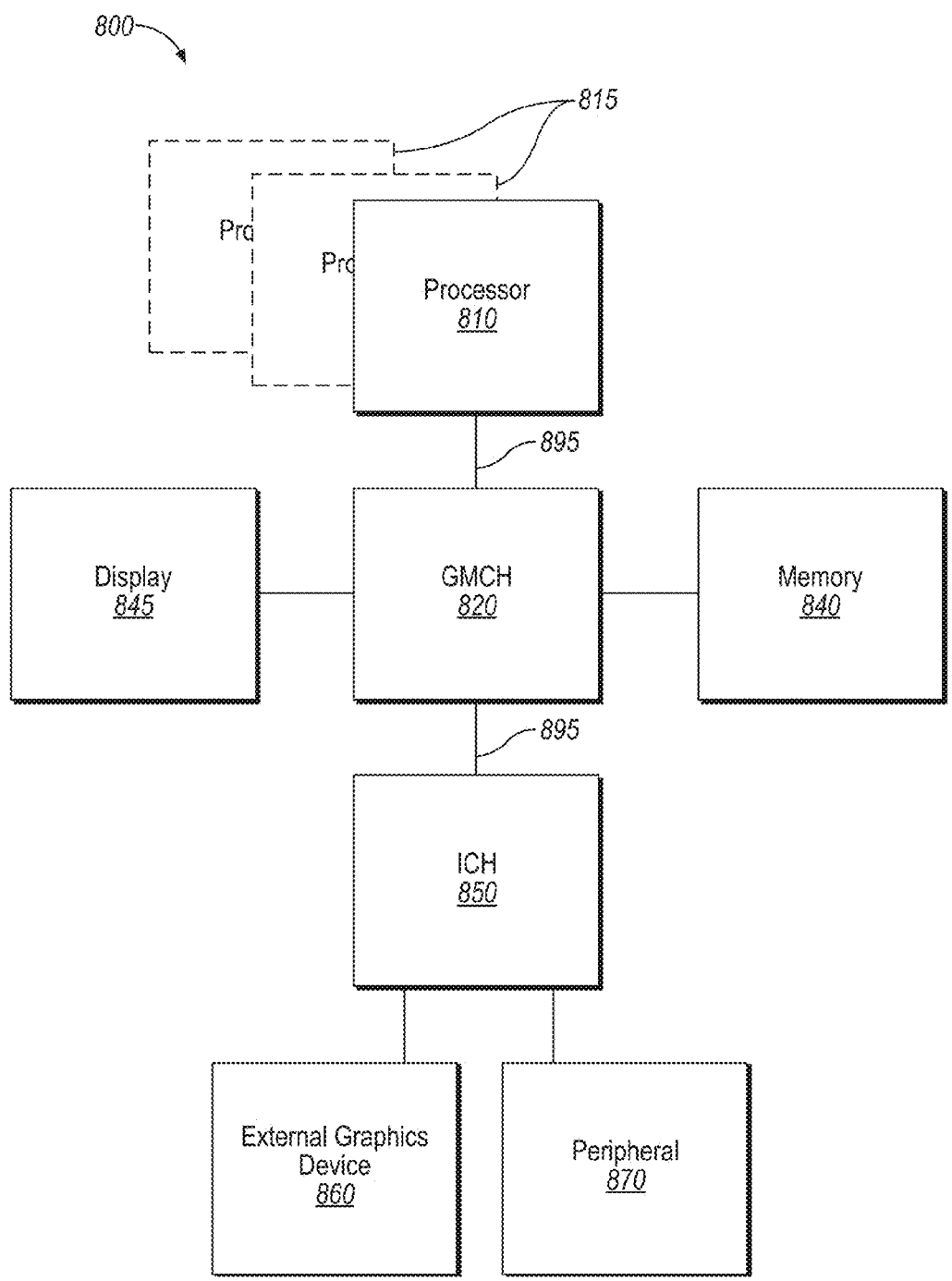
FIG. 8 is a block diagram illustrating a system in which an embodiment of the disclosure may be used.

Referring now to FIG. 8, shown is a block diagram of a system 800 in which one embodiment of the disclosure may operate. The system 800 may include one or more processors 810, 815, which are coupled to graphics memory controller hub (GMCH) 820. The optional nature of additional processors 815 is denoted in FIG. 8 with broken lines. In one embodiment, processors 810, 815 implement techniques for supporting configurable security levels for memory address ranges according to embodiments of the disclosure.

Each processor 810, 815 may be some version of the circuit, integrated circuit, processor, and/or silicon integrated circuit as described above. However, it should be noted that it is unlikely that integrated graphics logic and integrated memory control units would exist in the processors 810, 815. FIG. 8 illustrates that the GMCH 820 may be coupled to a memory 840 that may be, for example, a dynamic random access memory (DRAM). The DRAM may, for at least one embodiment, be associated with a non-volatile cache.

The GMCH 820 may be a chipset, or a portion of a chipset. The GMCH 820 may communicate with the processor(s) 810, 815 and control interaction between the processor(s) 810, 815 and memory 840. The GMCH 820 may also act as an accelerated bus interface between the processor(s) 810, 815 and other elements of the system 800. For at least one embodiment, the GMCH 820 communicates with the processor(s) 810, 815 via a multi-drop bus, such as a frontside bus (FSB) 895.

Furthermore, GMCH 820 is coupled to a display 845 (such as a flat panel or touchscreen display). GMCH 820 may include an integrated graphics accelerator. GMCH 820 is further coupled to an input/output (I/O) controller hub (ICH) 850, which may be used to couple various peripheral devices to system 800. Shown for example in the embodiment of FIG. 8 is an external graphics device 860, which may be a discrete graphics device, coupled to ICH 850, along with another peripheral device 870.

Alternatively, additional or different processors may also be present in the system 800. For example, additional processor(s) 815 may include additional processors(s) that are the same as processor 810, additional processor(s) that are heterogeneous or asymmetric to processor 810, accelerators (such as, e.g., graphics accelerators or digital signal processing (DSP) units), field programmable gate arrays, or any other processor. There can be a variety of differences between the processor(s) 810, 815 in terms of a spectrum of metrics of merit including architectural, micro-architectural, thermal, power consumption characteristics, and the like. These differences may effectively manifest themselves as asymmetry and heterogeneity amongst the processors 810, 815. For at least one embodiment, the various processors 810, 815 may reside in the same die package.

Figure 9:
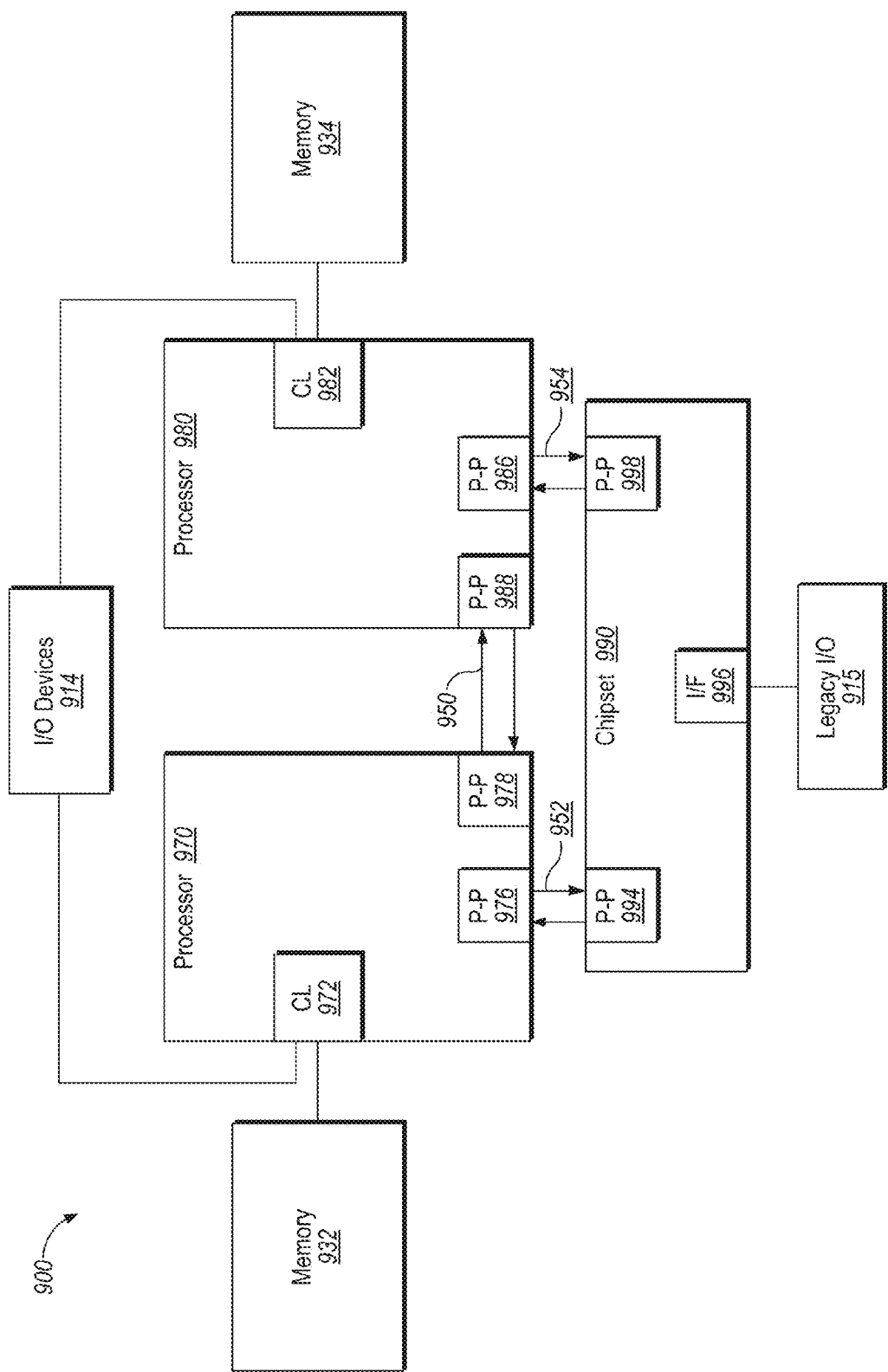
FIG. 9 is a block diagram illustrating a system in which an embodiment of the disclosure may be used.

Referring now to FIG. 9, shown is a block diagram of a system 900 in which an embodiment of the disclosure may operate. FIG. 9 illustrates processors 970, 980. In one embodiment, processors 970, 980 may implement techniques for supporting configurable security levels for memory address ranges as described above. Processors 970, 980 may include integrated memory and I/O control logic ("CL") 972 and 982, respectively and intercommunicate with each other via point-to-point interconnect 950 between point-to-point (P-P) interfaces 978 and 988 respectively. Processors 970, 980 each communicate with chipset 990 via point-to-point interconnects 952 and 954 through the respective P-P interfaces 976 to 994 and 986 to 998 as shown. For at least one embodiment, the CL 972, 982 may include integrated memory controller units. CLs 972, 982 may include I/O control logic. As depicted, memories 932, 934 coupled to CLs 972, 982 and I/O devices 914 are also coupled to the control logic 972, 982. Legacy I/O devices 915 are coupled to the chipset 990 via interface 996.

Figure 10:
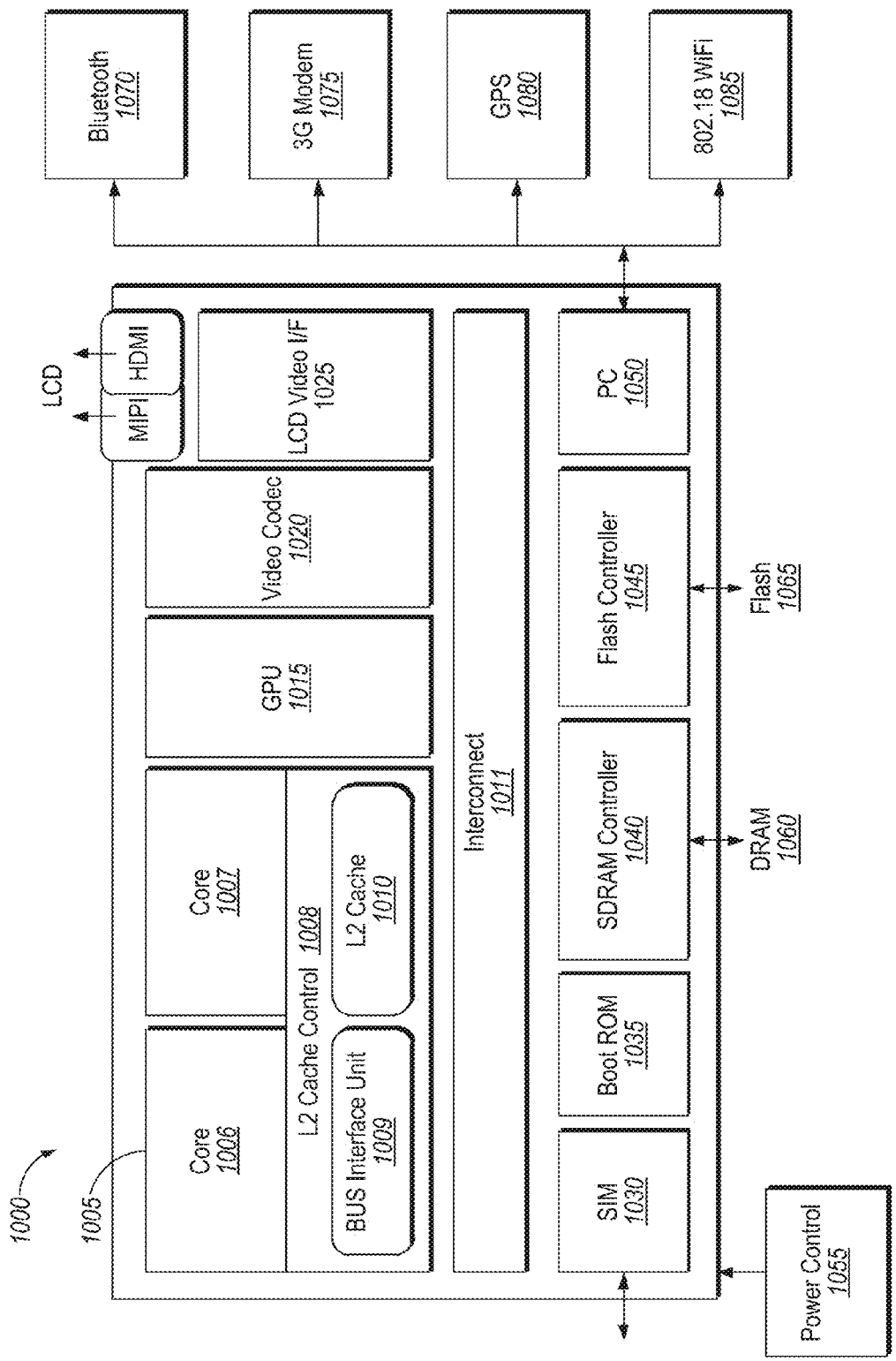
FIG. 10 is a block diagram illustrating a System-on-a-Chip (SoC) in which an embodiment of the disclosure may be used.

Embodiments may be implemented in many different system types. FIG. 10 is a block diagram of a SoC 1000 in accordance with an embodiment of the disclosure. Dashed lined boxes are optional features on more advanced SoCs. In FIG. 10, an interconnect unit(s) 1012 is coupled to: an application processor 1020 which includes a set of one or more cores 1002A-N and shared cache unit(s) 1006; a system agent unit 1010; a bus controller unit(s) 1016; an integrated memory controller unit(s) 1014; a set or one or more media processors 1018 which may include integrated graphics logic 1008, an image processor 1024 for providing still and/or video camera functionality, an audio processor 1026 for providing hardware audio acceleration, and a video processor 1028 for providing video encode/decode acceleration; an static random access memory (SRAM) unit 1030; a direct memory access (DMA) unit 1032; and a display unit 1040 for coupling to one or more external displays. In one embodiment, a memory module may be included in the integrated memory controller unit(s) 1014. In another embodiment, the memory module may be included in one or more other components of the SoC 1000 that may be used to access and/or control a memory. The application processor 1020 may include a PMU for implementing silent memory instructions and miss-rate tracking to optimize switching policy on threads as described in embodiments herein.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof.

In some embodiments, one or more of the cores 1002A-N are capable of multithreading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture and/or instruction set. For example, some of the cores 1002A-N may be in order while others are out-of-order. As another example, two or more of the cores 1002A-N may be capable of execution the same instruction set, while others may be capable of executing only a subset of that instruction set or a different instruction set.

The application processor 1020 may be a general-purpose processor, such as a Core™ i3, i5, i7, 2 Duo and Quad, Xeon™, Itanium™, Atom™ or Quark™ processor, which are available from Intel™ Corporation, of Santa Clara, Calif. Alternatively, the application processor 1020 may be from another company, such as ARM Holdings™, Ltd, MIPS™, etc. The application processor 1020 may be a special-purpose processor, such as, for example, a network or communication processor, compression engine, graphics processor, co-processor, embedded processor, or the like. The application processor 1020 may be implemented on one or more chips. The application processor 1020 may be a part of and/or may be implemented on one or more substrates using any of a number of process technologies, such as, for example, BiCMOS, CMOS, or NMOS.

Figure 11:
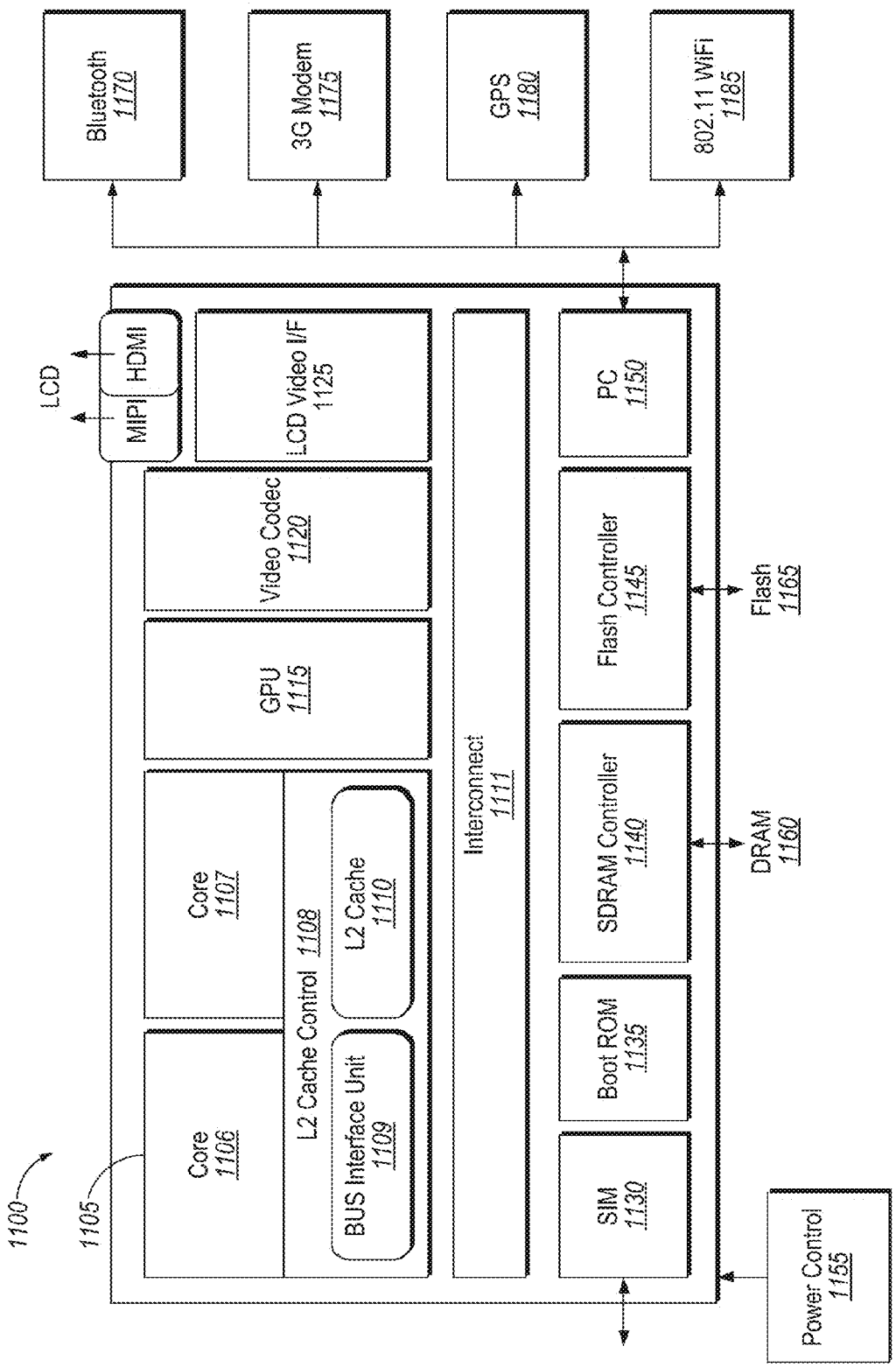
FIG. 11 is a block diagram illustrating a SoC design in which an embodiment of the disclosure may be used.

FIG. 11 is a block diagram of an embodiment of a system on-chip (SoC) design in accordance with the disclosure. As a specific illustrative example, SoC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1100 includes 2 cores—1106 and 1107. Cores 1106 and 1107 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1110 includes an on-chip interconnect, such as an IOSF, AMBA, or other interconnect discussed above, which potentially implements one or more aspects of the described disclosure. In one embodiment, cores 1106, 1107 may implement techniques for supporting configurable security levels for memory address ranges as described in embodiments herein.

Interconnect 1110 provides communication channels to the other components, such as a Subscriber Identity Module (SIM) 1130 to interface with a SIM card, a boot ROM 1140 to hold boot code for execution by cores 1106 and 1107 to initialize and boot SoC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the disclosure described herein. In addition, the system 1100 illustrates peripherals for communication, such as a Bluetooth module 1170, 3G modem 1175, GPS 1180, and Wi-Fi 1185.

Figure 12:
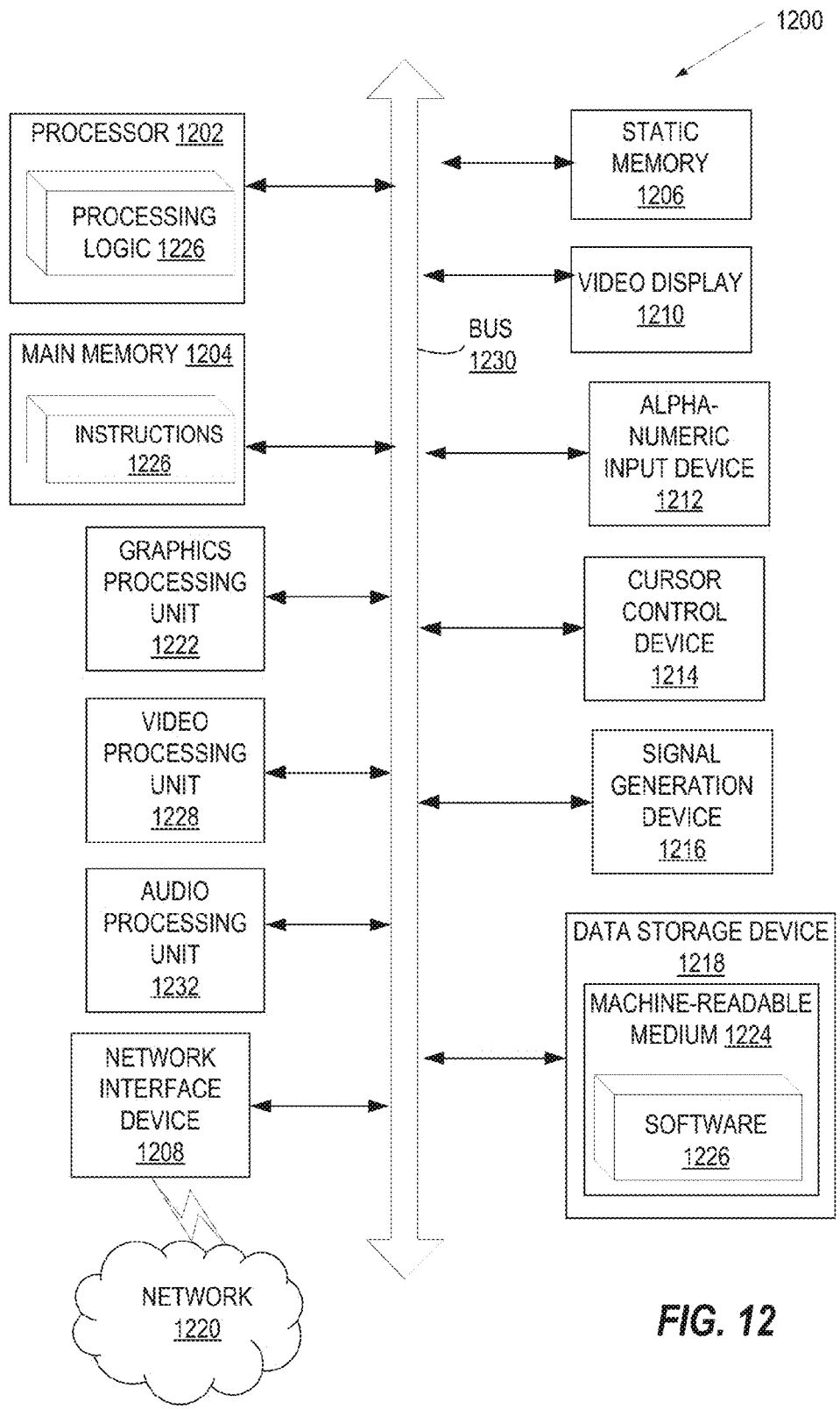
FIG. 12 illustrates a block diagram illustrating a computer system in which an embodiment of the disclosure may be used.

FIG. 12 illustrates a diagrammatic representation of a machine in the example form of a computer system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1200 includes a processing device 1202, a main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. In one embodiment, processing device 1202 may include one or processing cores. The processing device 1202 is configured to execute the processing logic 1226 for performing the operations and steps discussed herein. In one embodiment, processing device 1202 is the same as processor architecture 100 described with respect to FIG. 1 that implements techniques for supporting configurable security levels for memory address ranges as described herein with embodiments of the disclosure.

The computer system 1200 may further include a network interface device 1208 communicably coupled to a network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1216 (e.g., a speaker). Furthermore, computer system 1200 may include a graphics processing unit 1222, a video processing unit 1228, and an audio processing unit 1232.

The data storage device 1218 may include a machine-accessible storage medium 1224 on which is stored software 1226 implementing any one or more of the methodologies of functions described herein, such as implementing silent memory instructions and miss-rate tracking to optimize switching policy on threads in a processing device as described above. The software 1226 may also reside, completely or at least partially, within the main memory 1204 as instructions 1226 and/or within the processing device 1202 as processing logic 1226 during execution thereof by the computer system 1200; the main memory 1204 and the processing device 1202 also constituting machine-accessible storage media.

The machine-readable storage medium 1224 may also be used to store instructions 1226 implementing silent memory instructions and miss-rate tracking to optimize switching policy on threads in a processing device such as described with respect to processing device 100 in FIG. 1, and/or a software library containing methods that call the above applications. While the machine-accessible storage medium 1128 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

The following examples pertain to further embodiments.

Example 1 is a processor comprising: a) a processing core; b) a memory controller, operatively coupled to the processing core, to access data in an off-chip memory; and c) a memory encryption engine (MEE) operatively coupled to the memory controller, the MEE is to: responsive to detecting a memory access operation with respect to a memory location identified by a memory address within a memory address range associated with the off-chip memory, 1) identify a security level indicator associated with the memory location based on a value stored on a security range register; and 2) access at least a portion of a data item associated with the memory address range of the off-chip memory in view of the security level indicator.

In Example 2, the subject matter of Example 1, wherein the security level indicator identifies an encryption-only memory range and a full-protection memory range of the off-chip memory.

In Example 3, the subject matter of any one of Examples 1-2, wherein the security level indicator comprises one or more memory address ranges to identify at least one of the encryption-only memory range and the full-protection memory range of the off-chip memory.

In Example 4, the subject matter of any one of Examples 1-3, wherein the security level indicator comprises a memory address that divides the off-chip memory into the encryption-only memory range and the full-protection memory range.

In Example 5, the subject matter of any one of Examples 1-4, wherein responsive to detecting that the data item to be transmitted to the encryption-only memory range of the off-chip memory, the MEE is further to encrypt data associated with the data item.

In Example 6, the subject matter of any one of Examples 1-5, wherein responsive to detecting that the data item to be transmitted from the encryption-only memory range of the off-chip memory, the MEE is further to decrypt data associated with the data item.

In Example 7, the subject matter of any one of Examples 1-6, wherein responsive to detecting that the data item to be transmitted to the full-protection memory range of the off-chip memory, the MEE is further to store encryption metadata associated with the data item.

In Example 8, the subject matter of any one of Examples 1-7, wherein responsive to detecting that the data item to be transmitted from the full-protection memory range of the off-chip memory, the MEE is further to retrieve encryption metadata associated with the data item.

In Example 9, the subject matter of any one of Examples 1-8, wherein the data is protected by instruction set architecture (ISA) instructions associated with the processor cores, the ISA instructions protect the data from software attacks and a range of memory associated with the ISA instructions is stored in the full-protection memory range to protect the data from active and replay attacks.

Various embodiments may have different combinations of the structural features described above. For instance, all optional features of the processor described above may also be implemented with respect to a method or process described herein and specifics in the examples may be used anywhere in one or more embodiments.

Example 10 is a method comprising 1) responsive to detecting a memory access operation with respect to a memory location identified by a memory address within a memory address range associated with an off-chip memory device, identifying, using a processing device, a security level indicator associated with the memory location based on a value stored on a security range register; and 2) accessing, using the processing device, at least a portion of a data item associated with the memory address range of the off-chip memory in view of the security level indicator.

In Example 11, the subject matter of Example 10, wherein the security level indicator identifies an encryption-only memory range and a full-protection memory range of the off-chip memory device.

In Example 12, the subject matter of any one of Example 10-11, wherein the security level indicator comprises one or more memory address ranges identifying at least one of the encryption-only memory range and the full-protection memory range of the off-chip memory device.

In Example 13, the subject matter of any one of Example 10-12, wherein the security level indicator comprises a memory address that divides the off-chip memory into the encryption-only memory range and the full-protection memory range.

In Example 14, the subject matter of any one of Example 10-13, further comprising responsive to detecting that the data item to be transmitted to the encryption-only memory range of the off-chip memory device, encrypting data associated with the data item.

In Example 15, the subject matter of any one of Example 10-14, further comprising responsive to detecting that the data item to be transmitted from the encryption-only memory range of the off-chip memory device, decrypting data associated with the data item.

In Example 16, the subject matter of any one of Example 10-15, further comprising responsive to detecting that the data item to be transmitted to the full-protection memory range of the off-chip memory, generating encryption metadata associated with the data item.

In Example 17, the subject matter of any one of Example 10-16, further comprising responsive to detecting that the data item to be transmitted from the full-protection memory range of the off-chip memory, retrieving encryption metadata associated with the data item.

In Example 18, the subject matter of any one of Example 10-17, wherein the data is protected by instruction set architecture (ISA) instructions associated with the processor cores, the ISA instructions protect the data from software attacks and a range of memory associated with the ISA instructions is stored in the full-protection memory range to protect the data from active and replay attacks.

Various embodiments may have different combinations of the operational features described above. For instance, all optional features of the methods described above may also be implemented with respect to a non-transitory, computer-readable storage medium. Specifics in the examples may be used anywhere in one or more embodiments.

Example 19 is a non-transitory, computer-readable storage medium including instructions that when executed by a processor, cause the processor to: a) responsive to detecting a memory access operation with respect to a memory location identified by a memory address within a memory address range associated with the off-chip memory, identify a security level indicator associated with the memory location based on a value stored on a security range register; and b) access at least a portion of a data item associated with the memory address range of the off-chip memory in view of the security level indicator.

In Example 20, the subject matter of Example 19, wherein the security level indicator identifies an encryption-only memory range and a full-protection memory range of the off-chip memory.

In Example 21, the subject matter of any one of Examples 19-20, wherein the security level indicator comprises one or more memory address ranges to identify at least one of the encryption-only memory range and the full-protection memory range of the off-chip memory.

In Example 22, the subject matter of any one of Examples 19-21, wherein the security level indicator comprises a memory address that divides the off-chip memory into the encryption-only memory range and the full-protection memory range.

In Example 23, the subject matter of any one of Examples 19-22, wherein responsive to detecting that the data item to be transmitted to the encryption-only memory range of the off-chip memory, the executable instructions further causes the processing system to encrypt data associated with the data item.

In Example 24, the subject matter of any one of Examples 19-23, wherein responsive to detecting that the data item to be transmitted from the encryption-only memory range of the off-chip memory, the executable instructions further causes the processing system to decrypt data associated with the data item.

In Example 25, the subject matter of any one of Examples 19-24, wherein responsive to detecting that the data item to be transmitted to the full-protection memory range of the off-chip memory, the executable instructions further causes the processing system to generate encryption metadata associated with the data item.

In Example 26, the subject matter of any one of Examples 19-25, wherein responsive to detecting that the data item to be transmitted from the full-protection memory range of the off-chip memory, the executable instructions further causes the processing system to the retrieve encryption metadata associated with the data item.

In Example 27, the subject matter of any one of Examples 19-26, wherein the data is protected by instruction set architecture (ISA) instructions associated with the processor cores, the ISA instructions protect the data from software attacks and a range of memory associated with the ISA instructions is stored in the full-protection memory range to protect the data from active and replay attacks.

Various embodiments may have different combinations of the structural features described above. For instance, all optional features of the processors and methods described above may also be implemented with respect to a system described herein and specifics in the examples may be used anywhere in one or more embodiments.

Example 28 is a non-transitory, computer-readable storage medium including instructions that, when executed by a processor, cause the processor to perform the subject matter of any one of Examples 9-16.

Example 29 is a system on chip (SoC) comprising a plurality of functional units and a memory controller unit (MCU) coupled to the plurality of functional units, wherein the MCU comprises a memory encryption engine (MEE), wherein the MEE is configured to perform the subject matter of any one of Examples 10-18.

In Example 30, the subject matter of Example 29, wherein the SoC further comprises the subject matter of any one of Examples 1-9 and 19-27.

Example 31 is an apparatus comprising: a) a plurality of functional units of a processor; b) means for responsive to detecting a memory access operation with respect to a memory location identified by a memory address within a memory address range associated with an off-chip memory, identifying a security level indicator associated with the memory location based on a value stored on a security range register; and c) means for accessing at least a portion of a data item associated with the memory address range of the off-chip memory in view of the security level indicator.

In Example 32, the subject matter of Example 31, further comprising the subject matter of any one of Examples 1-9 and 19-27.

Example 33 is a system comprising: a memory device and a processor comprising a memory encryption engine (MEE), wherein the processor is configured to perform the subject matter of any one of Examples 10-18.

In Example 34, the subject matter of Example 30, further comprising the subject matter of any one of Examples 1-9 and 19-27.

While the disclosure has been described with respect to a limited number of embodiments, those skilled in the art will appreciate numerous modifications and variations there from. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 910 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element.

A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processor comprising:
  a processing core;
  a memory controller, operatively coupled to the processing core, to access data in an off-chip memory; and
  a memory encryption engine (MEE) operatively coupled to the memory controller, the MEE is to:
    responsive to detecting a memory access operation with respect to a memory location identified by a memory address within a memory address range associated with the off-chip memory, identify a security level indicator associated with the memory location based on a value stored on a security range register, wherein the security level indicator identifies at least one of: an encryption-only memory range or a full-protection memory range of the off-chip memory; and
    access at least a portion of a data item associated with the memory address range of the off-chip memory in view of the security level indicator.

2. The processor of claim 1, wherein the security level indicator comprises one or more memory address ranges to identify at least one of the encryption-only memory range and the full-protection memory range of the off-chip memory.

3. The processor of claim 1, wherein the security level indicator comprises a memory address that divides the off-chip memory into the encryption-only memory range and the full-protection memory range.

4. The processor of claim 1, wherein responsive to detecting that the data item is to be transmitted to the encryption-only memory range of the off-chip memory, the MEE is further to encrypt data associated with the data item.

5. The processor of claim 1, wherein responsive to detecting that the data item is to be transmitted from the encryption-only memory range of the off-chip memory, the MEE is further to decrypt data associated with the data item.

6. The processor of claim 1, wherein responsive to detecting that the data item is to be transmitted to the full-protection memory range of the off-chip memory, the MEE is further to store encryption metadata associated with the data item.

7. The processor of claim 1, wherein responsive to detecting that the data item is to be transmitted from the full-protection memory range of the off-chip memory, the MEE is further to retrieve encryption metadata associated with the data item.

8. The processor of claim 1, wherein the data is protected by instruction set architecture (ISA) instructions associated with the processor cores, the ISA instructions protect the data from software attacks and a range of memory associated with the ISA instructions is stored in the full-protection memory range to protect the data from active and replay attacks.

9. A method, comprising:
  responsive to detecting a memory access operation with respect to a memory location identified by a memory address within a memory address range associated with an off-chip memory, identifying, using a processing device, a security level indicator associated with the memory location based on a value stored on a security range register, wherein the security level indicator identifies at least one of: an encryption-only memory range or a full-protection memory range of the off-chip memory; and
  accessing, using the processing device, at least a portion of a data item associated with the memory address range of the off-chip memory in view of the security level indicator.

10. The method of claim 9, wherein the security level indicator comprises one or more memory address ranges identifying at least one of the encryption-only memory range and the full-protection memory range of the off-chip memory.

11. The method of claim 9, wherein the security level indicator comprises a memory address that divides the off-chip memory into the encryption-only memory range and the full-protection memory range.

12. The method of claim 9, further comprising responsive to detecting that the data item is to be transmitted to the encryption-only memory range of the off-chip memory, encrypting data associated with the data item.

13. The method of claim 9, further comprising responsive to detecting that the data item is to be transmitted from the encryption-only memory range of the off-chip memory, decrypting data associated with the data item.

14. The method of claim 9, further comprising responsive to detecting that the data item is to be transmitted to the full-protection memory range of the off-chip memory, storing encryption metadata associated with the data item.

15. The method of claim 9, further comprising responsive to detecting that the data item is to be transmitted from the full-protection memory range of the off-chip memory, retrieving encryption metadata associated with the data item.

16. The method of claim 9, wherein the data is protected by instruction set architecture (ISA) instructions associated with the processor cores, the ISA instructions protect the data from software attacks and a range of memory associated with the ISA instructions is stored in the full-protection memory range to protect the data from active and replay attacks.

17. A computer-readable non-transitory storage medium comprising executable instructions that, when executed by a processing device, cause the processing device to:

responsive to detecting a memory access operation with respect to a memory location identified by a memory address within a memory address range associated with the off-chip memory, identify, by the processing device, a security level indicator associated with the memory location based on a value stored on a security range register, wherein the security level indicator identifies at least one of: an encryption-only memory range or a full-protection memory range of the off-chip memory; and access at least a portion of a data item associated with the memory address range of the off-chip memory in view of the security level indicator.

18. The computer-readable non-transitory storage medium of claim 17, wherein the processing device is further to responsive to detecting that the data item is to be transmitted to the encryption-only memory range of the off-chip memory, encrypt data associated with the data item.

* * * * *